United States Patent
Sadagopan et al.

(10) Patent No.: US 12,381,849 B2
(45) Date of Patent: Aug. 5, 2025

(54) POLYMORPHIC DYNAMIC FIREWALL

(71) Applicant: INTERNATIONAL BUSINESS MACHINES CORPORATION, Armonk, NY (US)

(72) Inventors: Satishkumar Sadagopan, Leawood, KS (US); Mudhakar Srivatsa, White Plains, NY (US); Dinesh C. Verma, New Castle, NY (US); Mathews Thomas, Flower Mound, TX (US); Utpal Mangla, Toronto (CA); Gerald Coon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 18/050,516

(22) Filed: Oct. 28, 2022

(65) Prior Publication Data
US 2024/0146693 A1  May 2, 2024

(51) Int. Cl.
*H04L 9/40* (2022.01)

(52) U.S. Cl.
CPC ...... *H04L 63/0263* (2013.01); *H04L 63/1425* (2013.01); *H04L 63/1433* (2013.01)

(58) Field of Classification Search
CPC ... H04L 9/40; H04L 63/0218; H04L 63/0263; H04L 63/0236; H04L 63/1425; H04L 63/1433; H04L 63/0227; H04L 63/1416; H04L 63/1483; G06F 21/577; G06F 9/45558
USPC .......................................................... 726/11
See application file for complete search history.

(56) References Cited

U.S. PATENT DOCUMENTS

| | | | |
|---|---|---|---|
| 5,898,830 A | 4/1999 | Wesinger, Jr. | |
| 6,880,089 B1 | 4/2005 | Bommareddy | |
| 7,565,430 B2 * | 7/2009 | Kortum | H04L 63/0209 709/225 |
| 7,966,655 B2 * | 6/2011 | Acharya | H04L 63/0263 726/11 |
| 8,032,933 B2 * | 10/2011 | Turley | H04L 63/0263 726/11 |
| 8,856,936 B2 * | 10/2014 | Datta Ray | H04L 63/1433 726/25 |

(Continued)

OTHER PUBLICATIONS

Jin et al. "Traffic Engineering of High-Rate Large-Sized Flows." 2013 IEEE 14th International Conference on High Performance Switching and Routing, IEEE, Downloaded: Aug. 26, 2022, 8 pages.

(Continued)

*Primary Examiner* — James N Fiorillo
(74) *Attorney, Agent, or Firm* — Lily Neff

(57) ABSTRACT

A method, computer system, and a computer program product is provided for establishing a dynamically adaptive network firewall. A firewall model is established that identifies resources that can be used and a plurality of nodes that connect to one another to form a network. A set of external rules and policies are provided to each resource. The firewall implemented using the firewall model upon receiving of incoming data and upon traffic flow. The firewall expands or contracts the network by adding or removing resources according to work that needs to be performed. The work includes both tasks to be completed and efforts that has to be taken by the firewall to ensure security by preventing unauthorized access into the network.

20 Claims, 3 Drawing Sheets

(56) References Cited

U.S. PATENT DOCUMENTS

| | | | | |
|---|---|---|---|---|
| 9,094,449 B2* | 7/2015 | Brueckner | | G06F 21/552 |
| 10,484,334 B1* | 11/2019 | Lee | | H04L 67/30 |
| 10,855,700 B1* | 12/2020 | Jeyaraman | | H04L 63/1425 |
| 11,824,897 B2* | 11/2023 | Kwan | | H04L 41/0823 |
| 11,863,528 B1* | 1/2024 | Chung | | H04L 69/22 |
| 2005/0204402 A1* | 9/2005 | Turley | | H04L 63/0263 726/11 |
| 2007/0271453 A1* | 11/2007 | Pohja | | H04W 12/068 713/153 |
| 2012/0054866 A1* | 3/2012 | Evans | | H04L 63/1416 709/224 |
| 2013/0269033 A1* | 10/2013 | Amaya Calvo | | H04L 63/0227 726/23 |
| 2014/0245423 A1* | 8/2014 | Lee | | H04L 63/20 726/12 |
| 2015/0326532 A1* | 11/2015 | Grant | | H04L 63/0218 726/1 |
| 2015/0341377 A1* | 11/2015 | Kasturi | | G06F 16/955 726/23 |
| 2016/0285828 A1* | 9/2016 | Keohane | | H04L 63/0263 |
| 2016/0294772 A1* | 10/2016 | Padmanabhan | | H04L 63/0263 |
| 2018/0026944 A1* | 1/2018 | Phillips | | H04L 63/1433 726/4 |
| 2018/0063194 A1* | 3/2018 | Vaidya | | H04L 63/0263 |
| 2019/0020671 A1* | 1/2019 | Komárek | | G06F 21/552 |
| 2019/0058690 A1* | 2/2019 | Huang | | H04L 61/2517 |
| 2019/0260794 A1* | 8/2019 | Woodford | | G06F 21/554 |
| 2020/0177550 A1* | 6/2020 | Valluri | | H04L 63/0272 |
| 2020/0403971 A1* | 12/2020 | Wang | | H04L 41/0886 |
| 2022/0116423 A1* | 4/2022 | Cummins | | H04L 63/20 |
| 2022/0116427 A1* | 4/2022 | Kwan | | H04L 41/0823 |
| 2022/0166756 A1* | 5/2022 | Gupta | | H04L 41/16 |
| 2022/0292199 A1* | 9/2022 | Mosko | | H04L 63/1433 |
| 2024/0028358 A1* | 1/2024 | Liu | | H04L 63/20 |

OTHER PUBLICATIONS

Kiran et al., "Understanding Flows in High-Speed Scientific Networks: A Netflow Data Study." ScienceDirect, Future Generation Computer Systems, vol. 94, May 2019, 11 pages.

* cited by examiner

POLYMORPHIC DYNAMIC FIREWALL

BACKGROUND

The present invention relates generally to the field of information security and more particularly to techniques for managing a polymorphic dynamic firewall.

The continuous growth and reliance of the Internet has made online security a necessity. The availability of sensitive data online coupled with the increasing sophistication of attacks often results in increased vulnerability. One way to provide for security, especially between external and internal networks may be by the creation of a firewall.

A firewall may be referred to a network security system that monitors and controls incoming and outcoming network traffic. A firewall can be a combination of hardware and software elements and often has predetermined security rules or policies. A firewall can act as a barrier between internal and external network hosts. A firewall may be constructed to centrally administer network security that extends to incoming logs and outgoing traffic. This will allow accountability of user actions and to trigger alerts when unauthorized activities occur.

Unfortunately, firewall complexity constructed to lower attacks and vulnerability can have some negative effects. For example, complex firewalls can reduce availability of individual network services and applications. In addition, when firewalls may be under attack or heavy load, bottlenecks can be created. In addition, as the network bandwidth and processor speed continue to increase, the demand for optimizing firewall operations for improved performance also increases.

SUMMARY

Embodiments of the present invention disclose a method, computer system, and a computer program product for establishing a dynamically adaptive network firewall. A firewall model may be established that identifies resources that can be used and a plurality of nodes that connect to one another to form a network. A set of external rules and policies may be provided to each resource. The firewall may be implemented using the firewall model upon receiving of incoming data and upon traffic flow. The implemented firewall expands or contracts the network by adding or removing resources according to work that needs to be performed. The work includes both tasks to be completed and efforts that has to be taken by the firewall to ensure security by preventing unauthorized access into the network.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
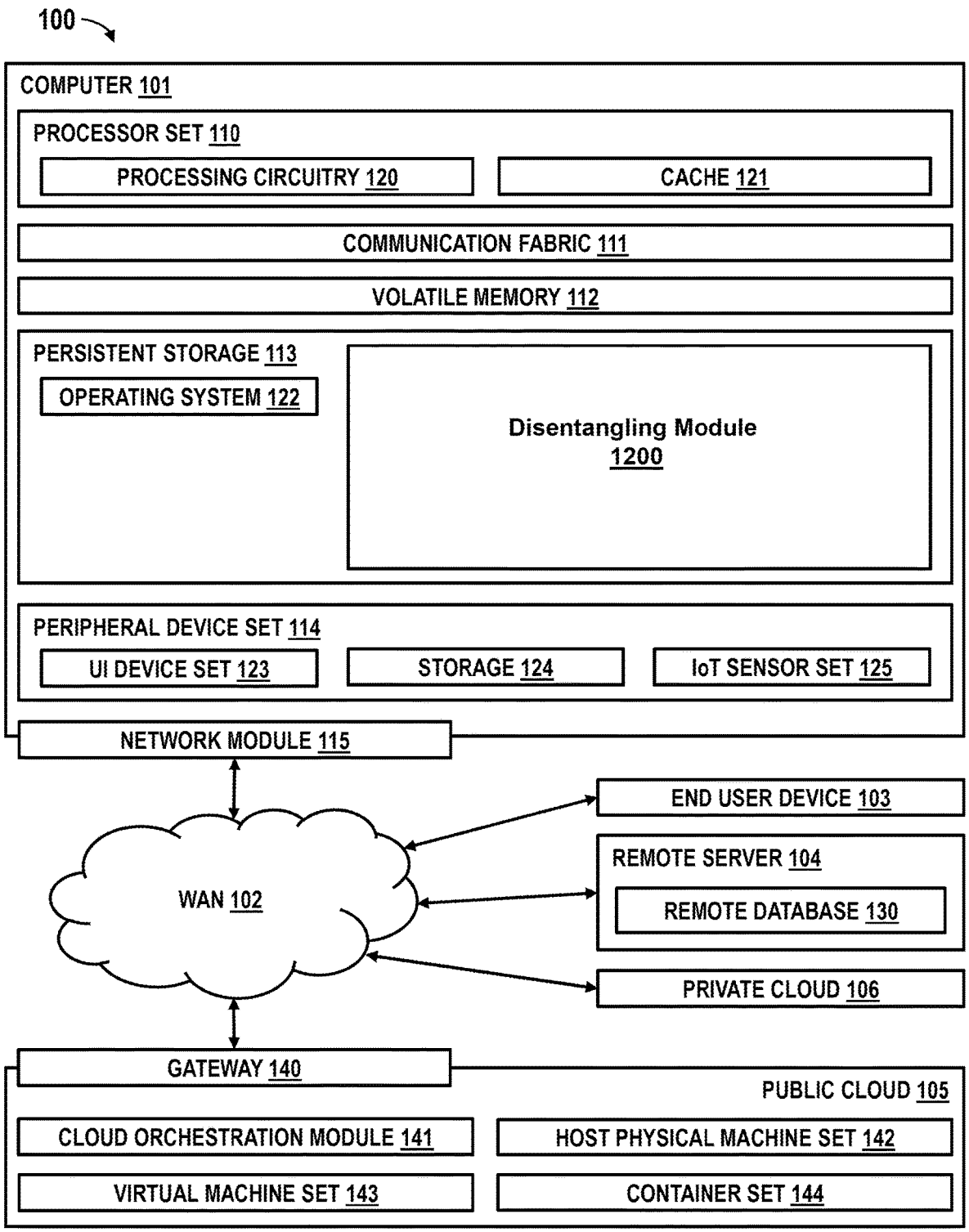
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a polymorphic firewall module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
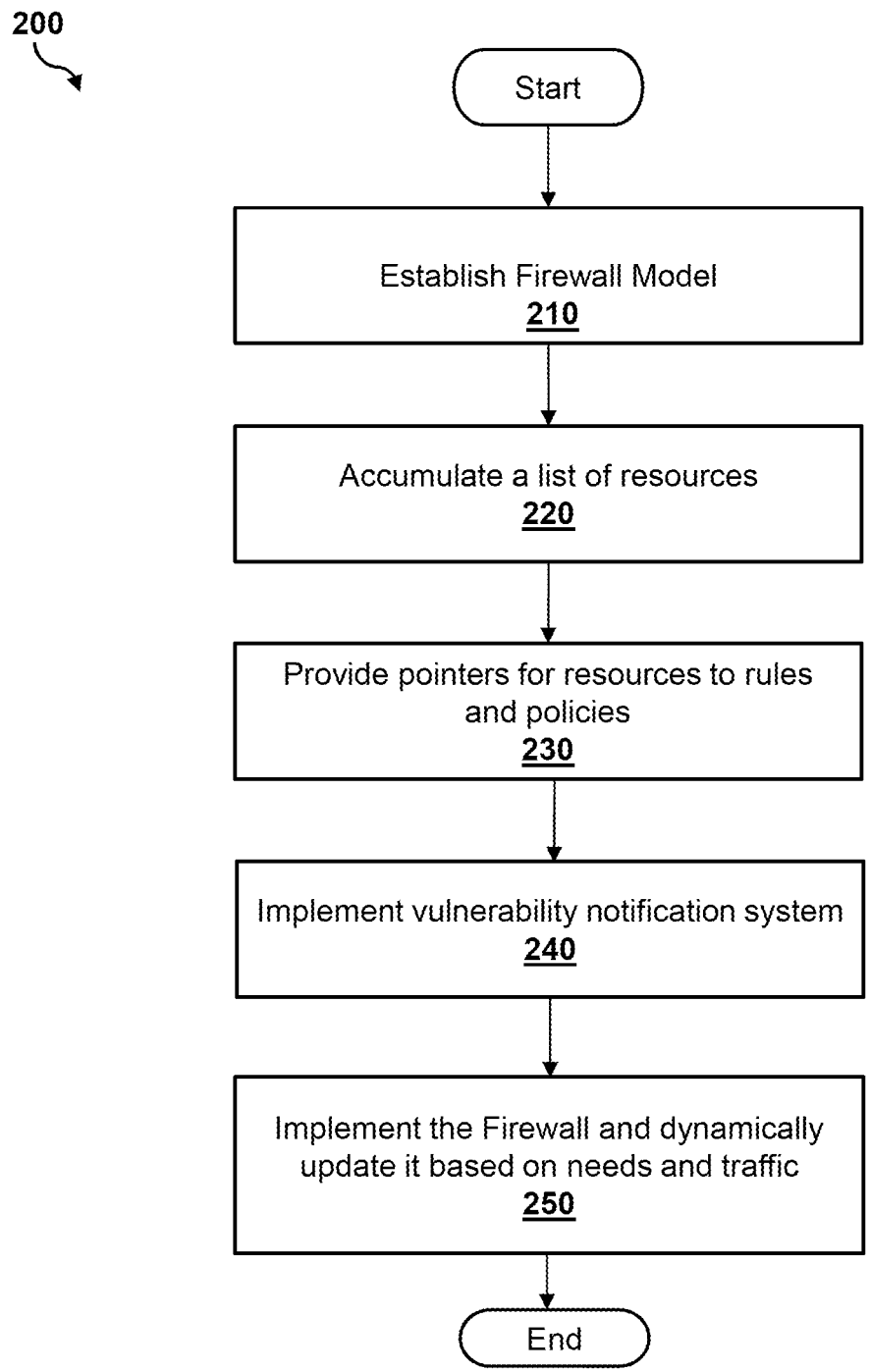
FIG. 2 provides an operational flowchart for generating a dynamic adaptive polymorphic firewall according to one embodiment.

FIG. 2 provides a flowchart depiction of a process 200 that can lead to the establishment of a polymorphic firewall. The process 200 has a plurality of steps as provided below.

In Step 210, a firewall model may be established. The model has a plurality of nodes that are connected together and through which data traffic will flow at one point. The nodes can be associated to one or more machines or devices. The nodes can be part of a network of interconnected nodes (and resources as will be explained later). They can be residing remotely from one another geographically or be local. They can also be connected to one another via a variety of other local area networks (LANs) or other such arrangements.

In Step 220, as part of the firewall model, a list of resources may be identified and in Step 230, for each resource, reference pointers to external rule lists may be provided. In this way a polymorphic firewall can be created as resources may be provided that have reference pointers to external rule lists and have credentials to instantiate resources of itself as needed. Upon the flow of traffic, the firewall credentials to instantiate these resources as needed. The resources may be part of the same network as nodes. Some of the resources can be associated and connected with one or more machines or devices. They can also reside in the cloud as appreciated by those skilled in the art.

In one embodiment, prior to processing of the traffic, the model provides a vulnerability notification system that can prompt changes in the firewall make-up improving the preparedness of the firewall to handle traffic when it does arrive. This helps the firewall to evolve based on the traffic flows, growth, or other characteristics of the traffic. The make-up of the firewall evolves and may be dynamic. In this way, it allows for an automatic instantiating of the type of resources best required to handle the traffic. This includes but may not be exclusive to resources on other cloud providers or in other parts of the world geographically to align to where the traffic need may arise.

In Step 250, the firewall may be implemented. The implemented firewall can expand, or contract based on the workflow and traffic. The two basic necessities may be handling the work and ensuring network security so that unauthorized access to the network may be prevented. Resources may be added or removed from the network based on necessity to complete the work and provide the security. Once the traffic flows, resources may be assigned to the work and added or removed to provide an optimal firewall network according to the model. The resources utilize the list of rules as was provided earlier.

The firewall, once implemented, will dynamically change and can reassign the edge interface of the firewall. This may be so that no single entity has to be essentially "the firewall" but the polymorphic firewall could completely evolve to different hardware/software running it. For example, in one scenario when a resource sits idle, the firewall may scale the resources to nothing or sleep all of them reducing the costs and operational overhead.

Figure 3:
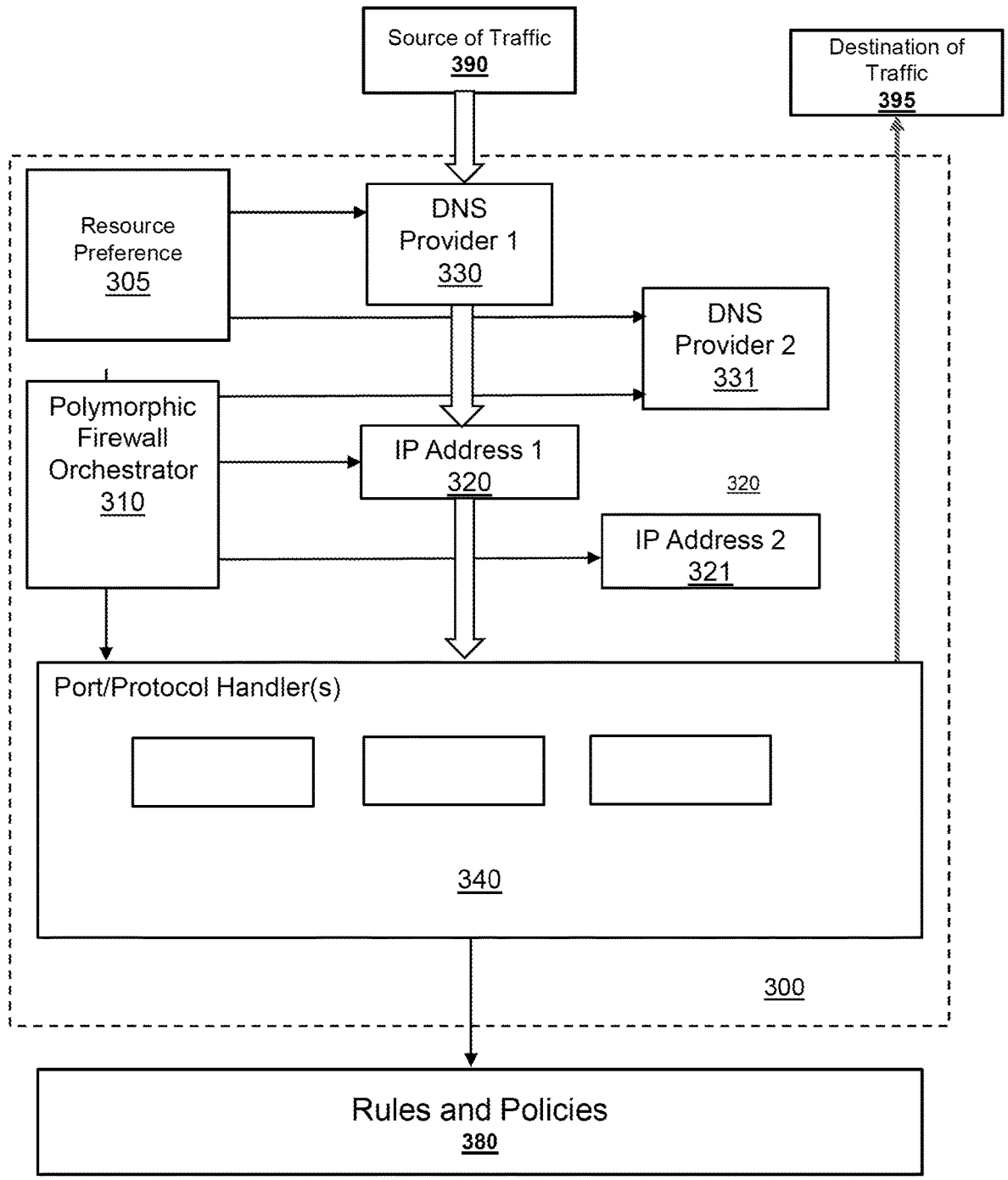
FIG. 3 provides a block diagram of a dynamic adaptive polymorphic firewall system such as the one provided by the flowchart of FIG. 2 according to an embodiment.

FIG. 3 provides an illustration for a block diagram that incorporates some of the concepts provided by the flowchart illustration of FIG. 2. As can be seen, a polymorphic firewall may be conceptually established using the model as referenced as 300. There may be a polymorphic firewall orchestrator 310 that has access or alternatively provides the resource preference list 305. The source of traffic and the destination of traffic may be outside of the firewall 300 and may be referenced respectively by numerals 390 and 395. The traffic may come and be destined for example from a variety of components. In one embodiment, this can be a node, a server, a network or the like as can be appreciated by those skilled in the art. The external rules and policies 380 may be provided and accessed by a variety of different components as shown.

In one embodiment, the orchestrator 310 may create a logical entity of the firewall service with a surface area. This can involve one or more Internet Protocol (IP) addresses (shown here as 320/321, although there may be more), or one or more domain name system (DNS), shown as 330/331, having separate provider information. In this particular example, only provided to aid understanding, components information acquired from 320-331 may compromise accessing some of the shared resources provided by the IP or DNS for use by the polymorphic firewall. In one embodiment, the polymorphic firewall may be configured with credentials to virtualization, docker, and/or cloud providers in order to instantiate common components (VMs, EC2 instances, Docker/Kubernetes containers, or new resources such as a quantum computer job). These instances can execute their tasks based off of a common set of rules for example in a database or flat files in a shared system.

In one embodiment, once the traffic begins flowing through the polymorphic firewall, it may continue to instantiate and assess resource requirements to handle the traffic. This may be provided by the Port or protocol handlers shown at 340. For example, in one scenario, if an encrypted packet inspection may be required/requested/configured, the firewall will instantiate resources better suited to decrypting encrypted traffic and pass the processing of the traffic flow off to the subcomponent created for this flow.

In one embodiment, the example scenario provided may create overlaps with an existing software defined by the firewall. However, implementations can be made to overcome this. Bad flows of undesirable traffic can be analogized to evolving viruses in biology. Implementing the polymorphic firewall allows the creation of a type of policy that can instantiate new previously nonexistent methods of handling the novel traffic (viruses) much like a vaccine prepares a biological entity to handle undesirable interactions before needed. Therefore, the resources do not have to exist and or become costly until traffic may be detected. By then, the polymorphic firewall has acquired sufficient (similar to the vaccine example) level knowledge of what resources need to be created to handle the particular type of traffic that has commenced and instantiate resources and processes to handle the traffic.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for constructing a dynamically adaptive network firewall, comprising:
    identifying a plurality of nodes and resources connected to one another in a network having a network firewall, through which a data traffic flows;
    creating a logical entity of firewall resources and services with a surface area;
    establishing a firewall model for providing traffic flow using said logical entity having one or more Internet Protocol addresses or domain name systems and preventing unauthorized access to resources, wherein said firewall model directs said data traffic flow by establishing reference pointers to a set of external rules and rules lists;
    using said firewall model, to instantiating resources as needed according to resource capability for handing one or more task completion and/or for providing network security for said network firewall, wherein said firewall grows or contracts according to characteristics of data traffic flow and includes one or more resources provided geographically through one or more cloud providers;

implementing said firewall network using said firewall model using said instantiated resources and dynamically using said model upon receiving data traffic, to expands or contracts said network by said firewall model by adding or removing resources according to work relating to handling said one or more task completion and work related to providing network security so unauthorized access to said network is prevented;

continuously monitoring said network using said firewall model so that unauthorized access to said network is prevented and determining any vulnerabilities to said firewall through said monitoring to modify said firewall and said network as needed.

2. The method of claim 1, further comprising establishing a vulnerability notification system for said firewall model; said vulnerability notification system prompting changes in said firewall once established.

3. The method of claim 2, wherein said vulnerability notification includes determining sudden traffic flow increases and decreases into said firewall network and said vulnerability system detecting any unauthorized attempts for access into said network.

4. The method of claim 3, wherein said vulnerability notification system prompt changes in said firewall make-up by improving preparedness to handle traffic when it does arrive.

5. This method of claim 1, wherein said resources can include standalone devices or a network of interconnected devices such as those included by a cloud provider.

6. The method of claim 5, wherein said resources can dispersed geographically.

7. The method of claim 1, wherein said firewall is established by selecting amongst a plurality of possible different combination of resources, an optimal combination that can select amongst the available resources those that can optimally provide results based on the traffic flows, growth, or other characteristics of the traffic.

8. The method of claim 1, wherein said firewall include resources that are connected to one or more devices.

9. The method of claim 1, further comprising implementing said firewall on one or more machines connected to network segments where the nodes reside; and using said one or more resources.

10. The method of claim 1, wherein further comprising implementing said firewall by automatically instantiating the type of resources best required to handle the traffic.

11. The method of claim 1, wherein said firewall model establishes reference pointers to said rules for said resources so that once said traffic flow starts, said rules can be used to instantiate resources as needed.

12. The method of claim 1, wherein resources can be reassigned for work or be put in idle mode depending on traffic flow.

13. A computer system for providing a dynamically adaptive firewall, comprising;

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps:

identifying a plurality of nodes and resources connected to one another in a network having a network firewall, through which a data traffic flows;

creating a logical entity of firewall resources and services with a surface area;

establishing a firewall model for providing traffic flow using said logical entity having one or more Internet Protocol addresses or domain name systems and preventing unauthorized access to resources, wherein said firewall model directs said data traffic flow by establishing reference pointers to a set of external rules and rules lists, using said firewall model, to instantiating resources as needed according to resource capability for handing one or more task completion and/or for providing network security for said network firewall, wherein said firewall grows or contracts according to characteristics of data traffic flow and includes one or more resources provided geographically through one or more cloud providers;

using said firewall model, to instantiating resources as needed and according to resource capability for banding one or more task completion and/or for providing network security for said network firewall;

implementing said firewall network using said firewall model using said instantiated resources and dynamically using said model upon receiving data traffic, to expands or contracts said network by said firewall model by adding or removing resources according to work relating to handling said one or more task completion and work related to providing network security so unauthorized access to said network is prevented;

continuously monitoring said network using said firewall model so that unauthorized access to said network is prevented and determining any vulnerabilities to said firewall through said monitoring to modify said firewall and said network as needed.

14. The computer system of claim 13, further comprising establishing a vulnerability notification system for said firewall model; said vulnerability notification system prompting changes in said firewall once established.

15. The computer system of claim 13, further comprising implementing said firewall on one or more machines connected to network segments where the nodes reside; and using said one or more resources.

16. The computer system of claim 13, wherein resources can be reassigned for work or be put in idle mode depending on traffic flow.

17. A computer program product for providing a dynamically adaptive firewall, comprising:

one or more computer-readable storage medium and program instructions stored on at least one of the one or more tangible storage medium, the program instructions executable by a processor, the program instructions comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps comprising:

identifying a plurality of nodes and resources connected to one another in a network having a network firewall, through which a data traffic flows; creating a logical entity of firewall resources and services with a surface area;

establishing a firewall model for providing traffic flow using said logical entity having one or more Internet Protocol addresses or domain name systems and preventing unauthorized access to resources, wherein said firewall model directs said data traffic flow by establishing reference pointers to a set of external rules and rules lists;

using said firewall model, to instantiating resources as needed according to resource capability for handing one or more task completion and/or for providing network security for said network firewall, wherein said firewall grows or contracts according to characteristics of data traffic flow and includes one or more resources provided geographically through one or more cloud providers;

implementing said firewall network using said firewall model using said instantiated resources and dynamically using said model upon receiving data traffic, to expands or contracts said network by said firewall model by adding or removing resources according to work relating to handling said one or more task completion and work related to providing network security so unauthorized access to said network is prevented;

continuously monitoring said network using said firewall model so that unauthorized access to said network is prevented and determining any vulnerabilities to said firewall through said monitoring to modify said firewall and said network as needed.

18. The computer program product of claim 17, further comprising establishing a vulnerability notification system for said firewall model; said vulnerability notification system prompting changes in said firewall once established.

19. The computer program product of claim 17, further comprising implementing said firewall on one or more machines connected to network segments where the nodes reside; and using said one or more resources.

20. The computer program product of claim 17, wherein resources can be reassigned for work or be put in idle mode depending on traffic flow.

* * * * *